Figure 1:
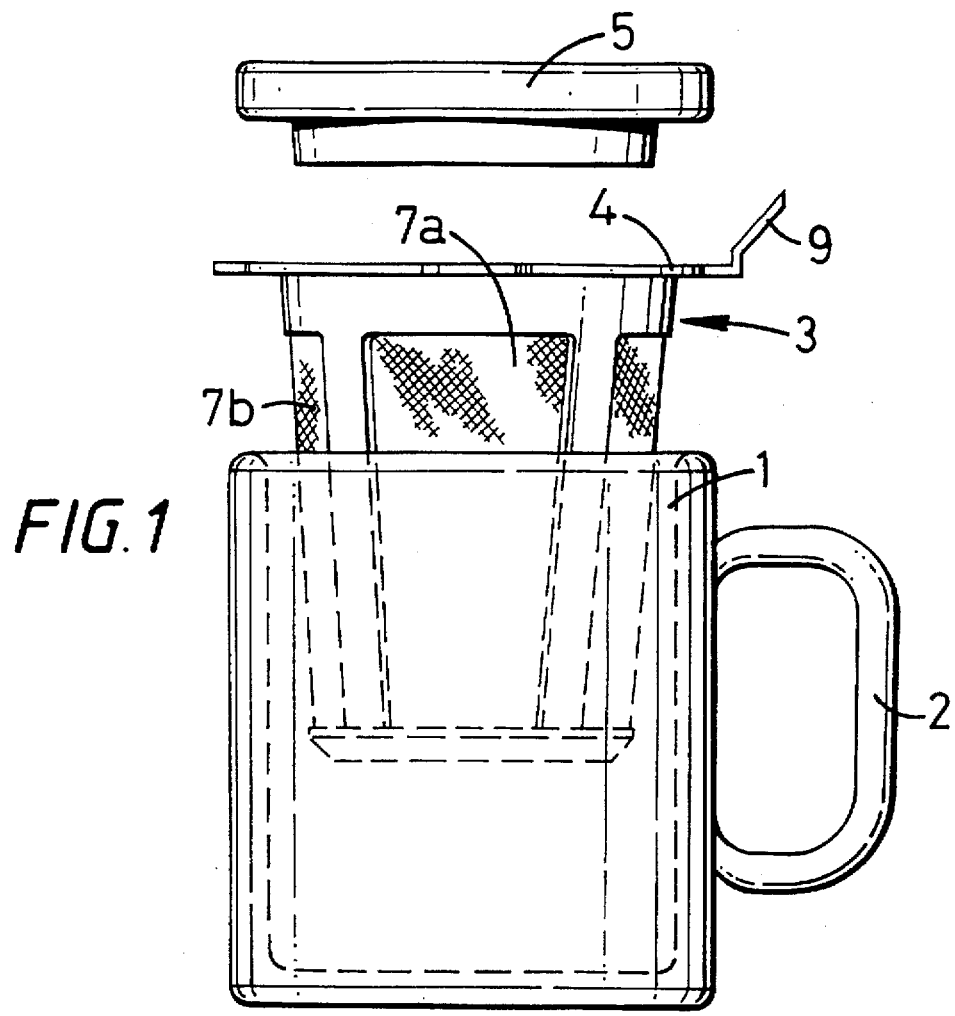

United States Patent [19]
Winnington-Ingram

[11] Patent Number: 5,738,786
[45] Date of Patent: Apr. 14, 1998

[54] DRINKING VESSELS

[75] Inventor: Francis C. Winnington-Ingram, London, United Kingdom

[73] Assignee: The London Teapot Company Ltd., London, England

[21] Appl. No.: 644,298

[22] Filed: May 13, 1996

[30] Foreign Application Priority Data

May 22, 1995 [GB] United Kingdom ............... 9510320

[51] Int. Cl.⁶ .................................................. B01D 29/085
[52] U.S. Cl. .................... 210/474; 210/477; D7/415; 206/0.5; 426/86; 99/295; 454/173
[58] Field of Search ................... 426/77, 86; 210/474, 210/477; 99/295; D3/202; 454/173; D7/400, 415; 206/0.5, 217, 446, 553

[56] References Cited

U.S. PATENT DOCUMENTS

| | | |
|---|---|---|
| 3,696,931 | 10/1972 | Hough ........................... 426/77 |
| 3,811,373 | 5/1974 | Telco ............................. 426/77 |
| 4,020,969 | 5/1977 | Ando ............................. 426/77 |
| 4,177,933 | 12/1979 | Lumpp .......................... 220/307 |
| 4,417,504 | 11/1983 | Yamamoto ................... 426/77 |
| 4,602,557 | 7/1986 | Yip ................................ 426/77 |
| 4,627,334 | 12/1986 | Shanklin ...................... 426/77 |
| 4,821,630 | 4/1989 | Roberts ........................ 426/77 |
| 5,325,765 | 7/1994 | Sylvan et al. ................ 426/77 |
| 5,370,227 | 12/1994 | Shibazaki et al. ........... 206/391 |
| 5,424,083 | 6/1995 | Lozito .......................... 426/77 |

*Primary Examiner*—W. L. Walker
*Attorney, Agent, or Firm*—Nixon & Vanderhye

[57] ABSTRACT

A container to receive an infuser of the kind formed from a wall structure of plastic material incorporating a mesh, and a lid for covering the container when the infuser is contained therein, said container having side walling incorporating support means which is arranged to support the infuser while spaced from said side walling so as to enable air to flow round the infuser and the lid having at least one opening to permit air to flow within the container to promote drying.

6 Claims, 2 Drawing Sheets

DRINKING VESSELS

The present invention relates to infusers for use in making cups of tea.

In our G.B. Patent Specification No. 2250425B we described a drinking vessel for beverages such as tea.

In that specification, a mug or cup was provided and an infuser was described in a form which comprised a skeletal wall structure of plastics material carrying a mesh to form a porous wall and having a shoulder resting on the top edge of the side wall of the cup. In one form of that invention the shoulder has outstanding tabs so that it can rest on cups of differing diameter.

Also, in our earlier G.B. Patent Specification 2,222,513 we described a teapot incorporating such an infuser. In that case the infuser had a rim which rested on the lid seat of the teapot and an outwardly extending handle.

The present invention is concerned with provision of a carrier for such an infuser which enables the infuser to be supported when not in use. In this respect, it is desirable that the infuser should be capable of drying out, and that it should be largely hidden from view.

Accordingly, the present invention comprises a container to receive an infuser of the kind formed from a wall structure of plastic material incorporating a mesh, and a lid for covering the container when the infuser is contained therein, said container having side walling incorporating support means which is arranged to support the infuser while spaced from said side walling so as to enable air to flow round the infuser and the lid having at least one opening to permit air to flow within the container to promote drying.

Figure 2:
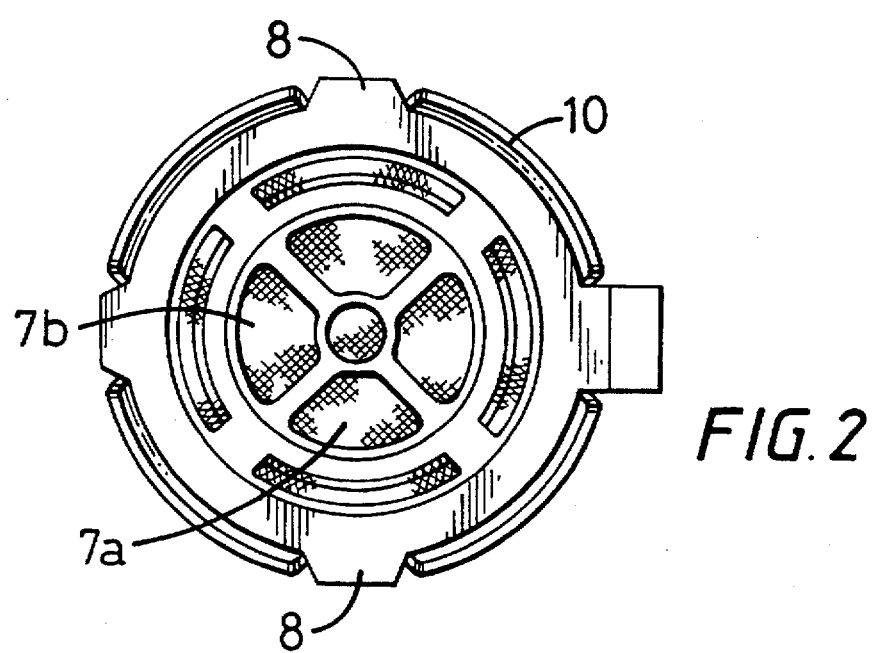
Figure 3:
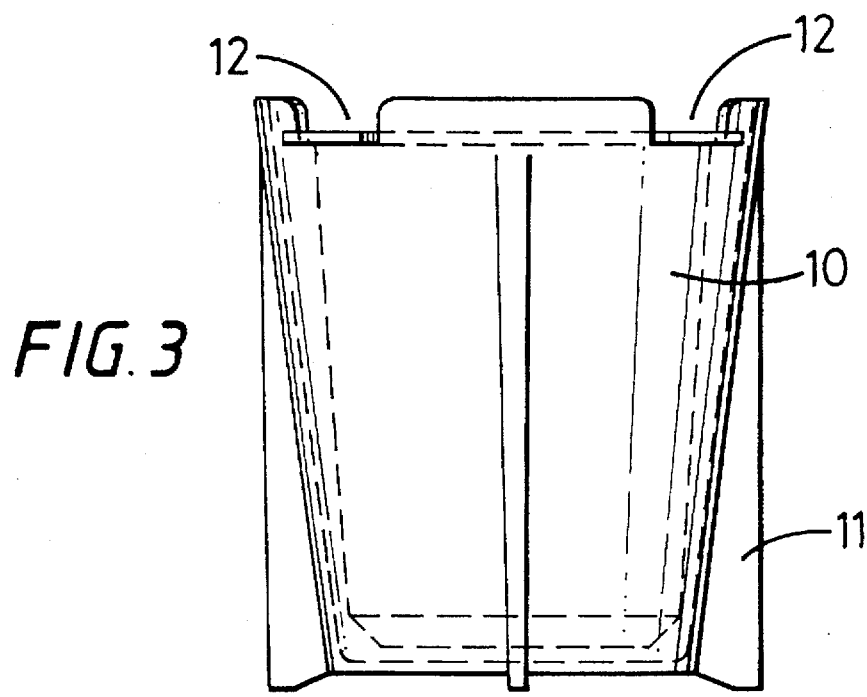
Figure 4:
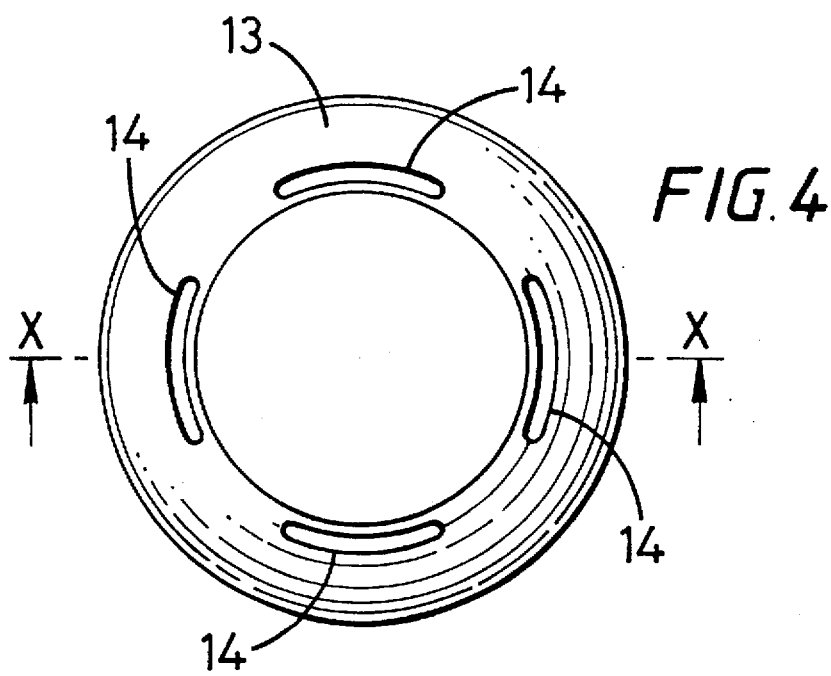
Figure 5:
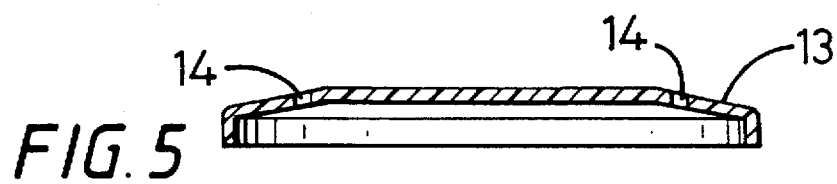

An embodiment of the invention will now be described by way of example with reference to the accompanying diagrammatic drawings in which:

FIG. 1 is an exploded view showing mug, infuser and lid;
FIG. 2 is a plan of the infuser resting in a carrier;
FIG. 3 shows a side view of the carrier; and
FIG. 4 shows a plan view of a lid for the carrier; and
FIG. 5 is a section on the lines X—X of FIG. 4.

Referring to FIG. 1, a conventional mug 1 with a handle 2 has an infuser 3 with an upper rim 4 which is arranged to sit on the upper lip of the mug. A lid 5 then loosely sits on top of the infuser 3.

The infuser 3 consists of an injection moulded skeletal structure 7 of plastics material which carries, within openings 7a, 7b in the skeletal structure, a porous wall for confining loose tea leaves. The infuser is shaped so as to extend to the bottom region of the mug so that tea leaves will be carried at the lower part of the mug with a maximum area exposed to hot water so that it can satisfactorily infuse with the tea leaves.

The upper rim 4 has outwardly extending tabs 8 so that the infuser can fit the upper lip of mugs or cups of various sizes and the infuser also has a handle 9 extending outwards from the rim 4.

In use, the infuser is placed on the rim of the mug 1, boiling water is poured into the infuser and the lid 5 is then put into position.

The tea is permitted to infuse for a short while, the infuser is then removed, and then a brewed quantity of tea is available in the cup for drinking.

When the infuser is removed it needs to be placed somewhere, and the present invention provides a carrier 10 for that purpose.

The container 10 can be formed of an injection moulded plastics material and has four equi-spaced fluted legs 1 as supports. It also has side walling including four recesses 12 to accommodate the tabs 8 and handle 9 so that the infuser can rest within the carrier with a small clearance all round which permits drying out of the infuser after use.

Finally, there is a lid 13 having four arcuate slots 14 in its top surface which enable the system to breathe, i.e. to enable air to flow via the various slots for drying out the infuser after use. This is necessary because the infuser will after use carry wet tea leaves and a surface wetness from the tea.

The small clearance referred to above is an important feature of the invention and as well as being provided by means of the tabs 8 and recesses 12 can be provided in other ways such as by support lugs on the wall of the container, or the infuser may have a continuous support rim which rests on an upper ledge or edge of the sidewalling. In each case the dimensions should be selected to achieve the clearance required.

Thus a carrier is provided which can be a decorative item which stores the infuser when not in use, and also permits the infuser to dry out after use.

I claim:

1. A storage container, in combination with a drinking vessel and an infuser for disposition in said drinking vessel, said infuser having a wall structure formed of plastic material and incorporating a mesh, and a lid for covering the container when the infuser is contained therein, said storage container being sized to receive said infuser for storage when wet after use, said container having an imperforate base and a side wall incorporating a support means for supporting said infuser spaced from said side wall to enable air to flow about said infuser, said lid being disposable on said container and having at least one opening to permit air to flow within the container to promote drying.

2. A storage container combination according to claim 1 wherein said infuser has tabs extending outwardly from an upper region thereof and said container has a top edge including recesses for accommodating said outwardly extending tabs of said infuser and forming openings to facilitate drying out of the infuser after use.

3. A storage container combination according to claim 2 wherein said lid has a top surface having slots therethrough for enabling air to flow to facilitate drying out the infuser after use.

4. A storage container for receiving and storing when wet after use an infuser of the kind formed from a wall structure of plastic material incorporating a mesh, in combination with a lid for covering the storage container when the infuser is contained therein, said container having an imperforate base and a side wall incorporating support means for supporting the infuser while spaced from said side wall so as to enable air to flow about the infuser, said lid having at least one opening to permit air to flow within the container to promote drying, said container having a top edge having recesses for accommodating outwardly extending tabs of the infuser and which create openings to facilitate drying out of the infuser after use and with the lid supported along the top edge of said container.

5. A storage container according to claim 4 in combination with said infuser.

6. A storage container according to claim 4 wherein said lid has a plurality of openings comprising slots through a top surface thereof to enable air flow into the container for drying out said infuser after use.

* * * * *